No. 685,790. Patented Nov. 5, 1901.
P. PANOULIAS.
CANDY COATING MACHINE.
(Application filed Jan. 19, 1901.)

(No Model.) 7 Sheets—Sheet 1.

Fig: 1

Witnesses:
F. A. Stewart
M. K. Lovirre

INVENTOR
Panayiotis Panoulias
BY Edgar Tate
ATTORNEYS

No. 685,790. Patented Nov. 5, 1901.
P. PANOULIAS.
CANDY COATING MACHINE.
(Application filed Jan. 19, 1901.)

(No Model.) 7 Sheets—Sheet 2.

Fig. 2.

WITNESSES
F. A. Stewart
M. H. Lowerre

INVENTOR
Panayiotis Panoulias
BY
Edgar Tate
ATTORNEYS

THE NORRIS PETERS CO., PHOTO-LITHO., WASHINGTON, D. C.

No. 685,790. Patented Nov. 5, 1901.
P. PANOULIAS.
CANDY COATING MACHINE.
(Application filed Jan. 19, 1901.)
(No Model.) 7 Sheets—Sheet 5.

WITNESSES
F. W. Stewart
M. H. Lowell

INVENTOR
Panayiotis Panoulias
BY
Edgar Tate Ho
ATTORNEYS

No. 685,790. Patented Nov. 5, 1901.
P. PANOULIAS.
CANDY COATING MACHINE.
(Application filed Jan. 19, 1901.)
(No Model.) 7 Sheets—Sheet 7.

UNITED STATES PATENT OFFICE.

PANAYIOTIS PANOULIAS, OF NEW YORK, N. Y.

CANDY-COATING MACHINE.

SPECIFICATION forming part of Letters Patent No. 685,790, dated November 5, 1901.

Application filed January 19, 1901. Serial No. 43,903. (No model.)

*To all whom it may concern:*

Be it known that I, PANAYIOTIS PANOULIAS, a subject of the King of Greece, residing at New York, in the county of New York and State of New York, have invented certain new and useful Improvements in Candy-Coating Machines, of which the following is a full and complete specification, such as will enable those skilled in the art to which it appertains to make and use the same.

This invention relates to machines for coating candies with chocolate; and the object thereof is to provide an improved machine of this class which is particularly designed for coating candies, such as cream centers and other small candies, with chocolate or other material; and with this and other objects in view the invention consists in a machine of the class specified constructed as hereinafter described and claimed.

The invention is fully disclosed in the following specification, of which the accompanying drawings form a part, in which—

Figure 1 is a side elevation of the right-hand side of my improved machine, part of the construction being in section; Fig. 8, a view similar to Fig. 7, showing the parts in a different position; Fig. 9, a perspective view of a detail of the construction; Figs. 4 to 11, inclusive, are on an enlarged scale; Fig. 12, a side elevation of a detail of the construction; and Fig. 13, a transverse sectional view of a candy-board which I employ.

In the drawings forming part of this specification I have shown my improved machine composed of two separate similar subdivisions which are exactly alike and which operate in the same manner and by means of the same mechanism, and in the practice of my invention I provide a strong upright frame comprising corner-posts 12, side posts $12^a$, horizontal side bars $12^b$, front and back bars $12^c$, a transverse middle bar $12^d$, and a horizontal top bar $12^e$. This frame, however, may be constructed in any suitable or any desired manner, and the above reference to the details thereof is made only to distinguish the separate parts of the frame, as shown in the drawings.

Extending from one side to the other of the frame and in the bottom rear portion thereof is a water-tank 13, which is open at the top and provided with a steam-pipe $13^a$, a water-supply pipe $13^b$, a water-exhaust pipe $13^c$, and an overflow-pipe $13^d$. A chocolate-receptacle 14 is set into the top of the water-tank 13 and extends the full length thereof and also from one side of the machine to the other, and said chocolate-receptacle is provided with an outlet-pipe $14^a$, by means of which the chocolate may be drawn off from the receptacle 14 whenever desired. The chocolate-receptacle 14 is also provided centrally with a transverse partition $14^b$, forming two separate compartments, each of which is provided with two separate hangers $14^c$, suspended from the central frame-bars, and in which in each compartment of the chocolate-receptacle is mounted a vertically-adjustable shaft $14^d$, each of which is provided with two separate sprocket-wheels $14^e$, over which are passed separate bucket-chains 15, said chains being connected by transversely-arranged buckets $15^a$. The chains 15 pass over the outer sides of vertically-arranged guides 16, secured to the frame of the machine and intended to prevent the opposite sides of said chains and the buckets thereon from interfering in the operation of the machine, as hereinafter described.

Figure 2:
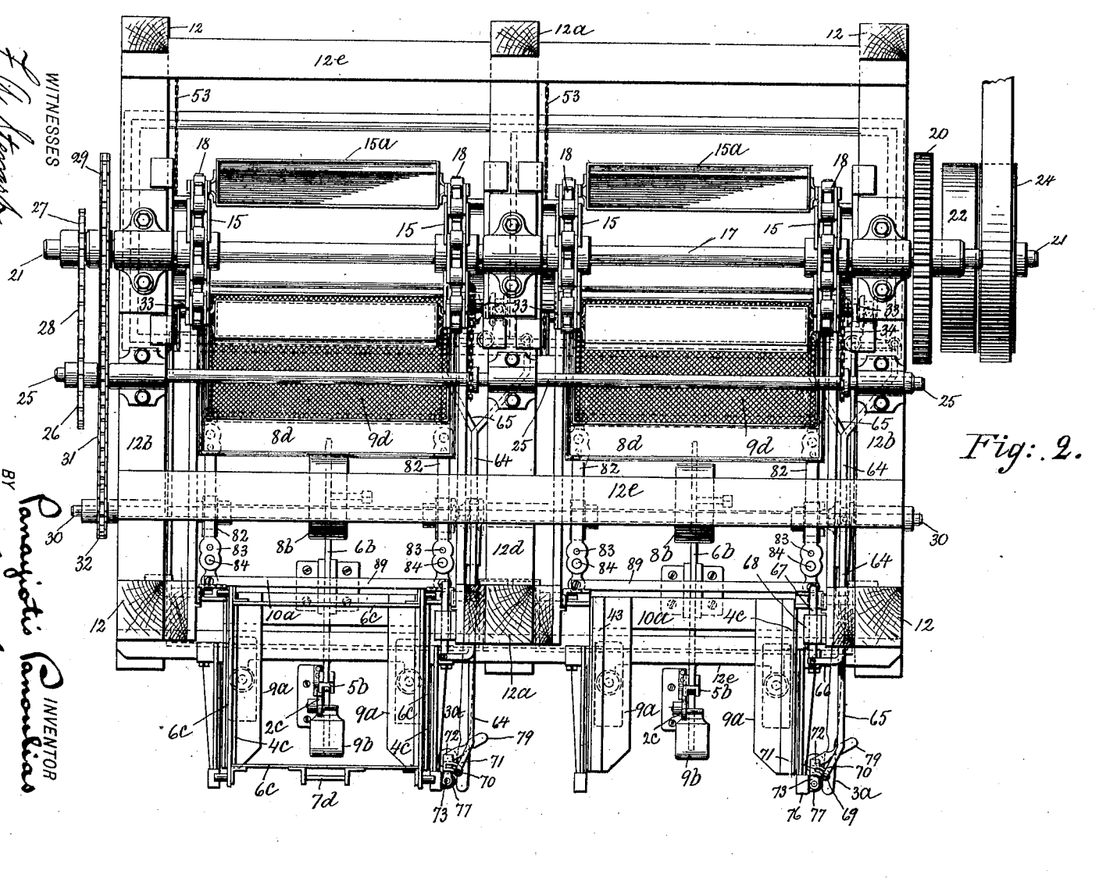
Fig. 2, a partial plan view of the machine.
Figure 3:
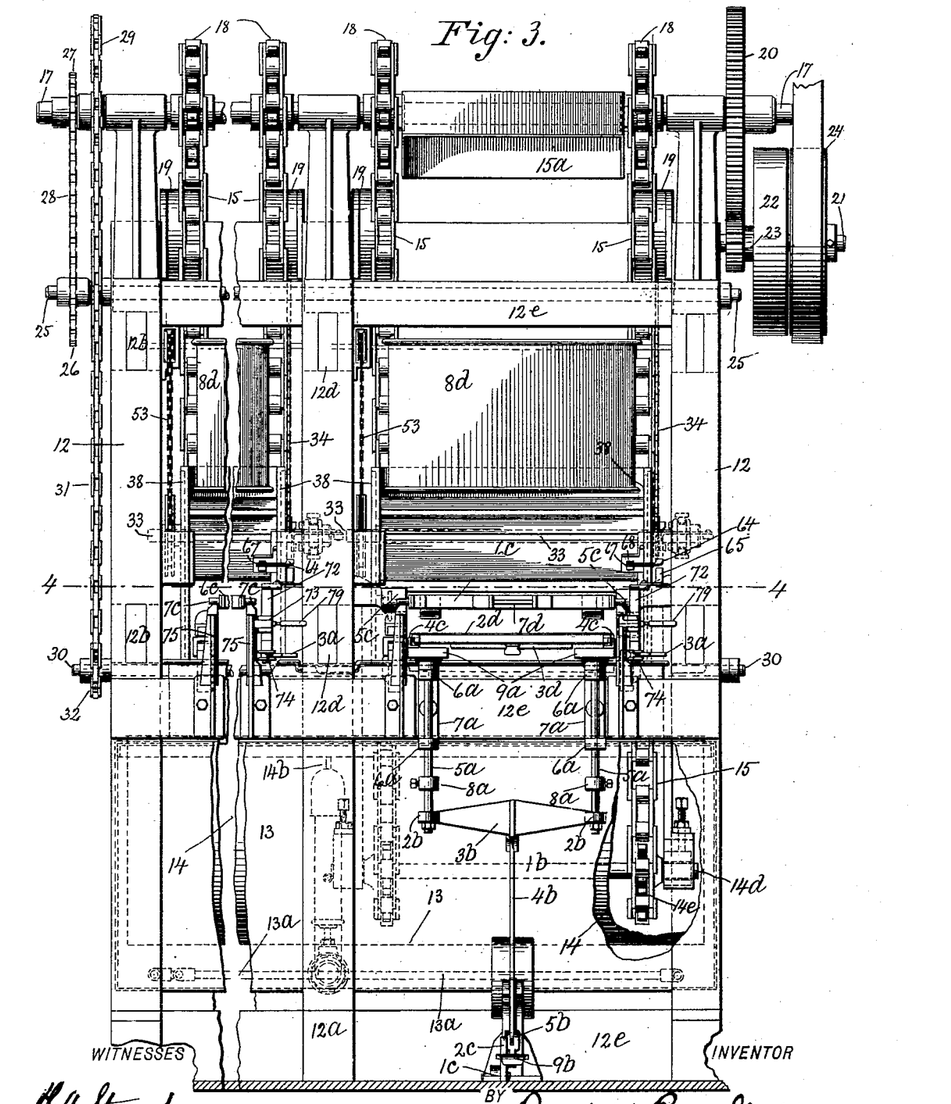
Fig. 3, a front elevation of the machine.

Mounted in suitable supports over the top of the frame is a shaft 17, extending parallel with the chocolate-receptacle, and this shaft is provided with sprocket-wheels 18, arranged in pairs, and over which the chains 15 pass, and the front reaches of the chains 15 below the sprocket-wheels 18 are passed between guides at 19, as shown in Figs. 1 and 3, so as to direct the same backwardly, as indicated in Fig. 1, and provide room for other operative parts of the machine mounted under and in front of the shaft 17. The shaft 17 is also provided with a large gear-wheel 20, and below the same is a stub-shaft 21, provided with a main power-wheel 22, having a pinion 23, operating in connection with the gear-wheel 20, and the stub-shaft 21 is also provided with a loosely-mounted pulley 24, of the same dimensions as the power-wheel 22.

Mounted in front of and below the shafts 17 and 21 is a shaft 25, provided at the left-hand end with a sprocket-wheel 26, geared in connection with a corresponding sprocket-wheel 27 on the shaft 17 by means of a drive-chain 28, and the shaft 17 is provided with a large sprocket-wheel 29, which is geared in connection with an agitator-shaft 30, mounted in the front lower portion of the frame, by means of a drive-chain 31 and a sprocket-wheel 32 on the shaft 30.

Mounted in each side of the main frame of the machine and over each of the compartments in the chocolate-receptacle and corresponding with each set of the chains 15 is a shaft 33, and these shafts 33 are geared in connection with the shaft 25 by means of chains 34. One of the shafts 33 and its connected parts are plainly shown in Figs. 6 and 7, and each of these shafts is provided at one end with a pulley-wheel or drum 35 and adjacent to each end with a sprocket or gear wheel 36. The shafts 33 are mounted in rectangular supplemental frames secured in the main frame and consisting of uprights 37 and forwardly and downwardly inclined side plates 38, and these side plates 38 are provided in their inner sides and at the bottom thereof with rectangular recesses 39, 40, 41, and 42, in the bottom of each of which is placed a guide-strip 43, and mounted on each of these guide-strips 43, except the top one, is a slide 44, and on the top strips and in the top recess 42 is a stationary plate 45. The bottom slide 44 is provided at its front edge with an upwardly and forwardly directed member 46 and a downwardly-directed plate 47, forwardly of which the said slide is provided with a slot or opening 48, and the intermediate slides 44 are curved downwardly at the forward edges and upwardly at the rearward edges, and the bottom slide is also curved upwardly at its rear edge, while the front edge of the top stationary plate 45 is curved downwardly, and the two intermediate slides are provided at their upper rear edges with transverse strips 45ª, and by reason of this construction the top slide when it is drawn downwardly and forwardly will catch on the forward edge of the plate 45, the next slide will catch on the forward edge of the top slide, and the bottom slide will catch on the forward edge of the next slide thereover, and these slides may be drawn downwardly in the supplemental frames in which they are mounted, as shown in Fig. 7, so as to completely close the bottom of said supplemental frames between the side plates 38. At each side of these supplemental frames and at the lower front portions thereof and within the side plates thereof are mounted sprocket or gear wheels 49, and these sprocket-wheels are geared in connection with the wheels 36 on the shafts 33 by chains 50. The lower slides 44, mounted between the side plates 38 of the supplemental frames, as hereinbefore described, are connected with these chains, as shown at 51, in Fig. 7, and said slides are also provided at their opposite sides with angle-brackets 52, designed to strengthen the said slides and to hold the upwardly and forwardly directed members 46 thereof in position, and by reason of the connection of the chains 50 with the bottom slides 44 all of said slides may be pulled down into the position shown in Fig. 7 by means of the said chains, and when the motion of the shafts 33 is reversed the said slides will be moved up into the position shown in Fig. 8.

The shafts 33 are each provided, as hereinbefore described, with a large pulley-wheel or drum 35, on each of which is wound a chain or other flexible device 53, and these chains or other flexible devices pass over a sprocket or pulley 54 in the upper rear portion of the main frame and are provided at their ends with weights 55, and the amount of said weights may be adjusted to any desired extent, and at the lower front ends of the supplemental frames in which the shafts 33 are mounted are vertically-arranged and forwardly-inclined strips or stops 56 to limit the downward movement of the slides 44.

Figure 6:
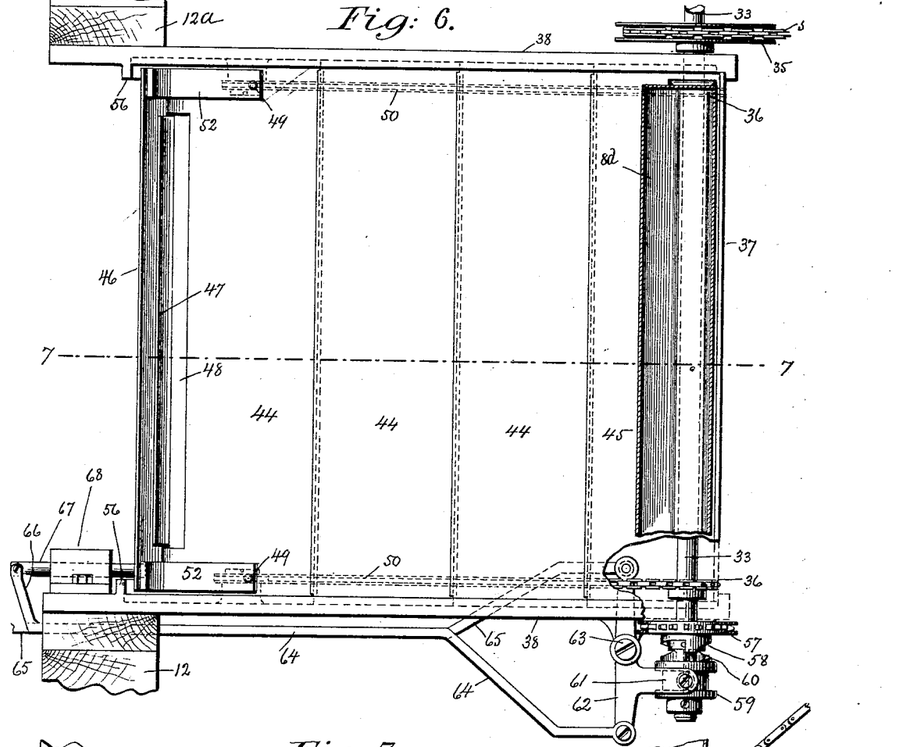
Fig. 6, a partial sectional plan of one subdivision of the machine on the line 6 6 of Fig. 1.
Figure 7:
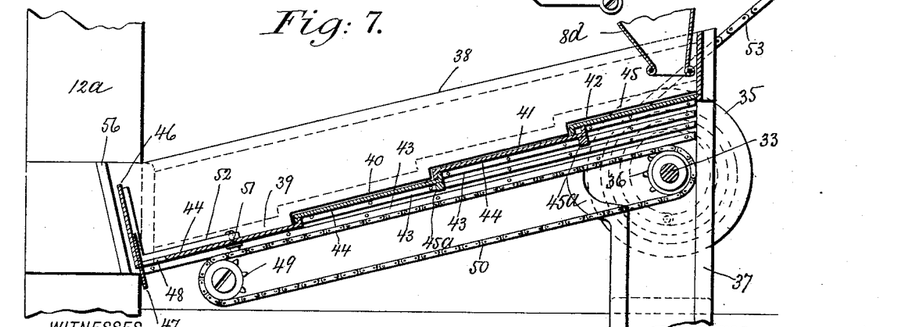
Fig. 7, a vertical longitudinal section on the line 7 7 of Fig. 6.

Each of the shafts 33 is provided with a sprocket-wheel 57, over which the chains 34 pass, and each of said sprocket-wheels is provided with a clutch-head 58, and collars 59 are mounted on the shafts 33 and provided with corresponding clutch-heads 60, as clearly shown in Fig. 6. The wheels 57 are loosely mounted on the shafts 33, and the collars 59 are free to slide on said shafts, being splined thereto. A yoke 61 is connected with each of the collars 59 in the usual manner, and each of said yokes is provided with a cross-head 62, pivoted to the supplemental frames or the side plates 38 thereof at 63, and pivotally connected with the opposite ends of the cross-heads 62 are angle-bars 64 and 65, and the bar 64 projects forwardly of the machine and is provided with an angular extension 66, pivotally connected with a bolt or rod 67, which extends backwardly a predetermined distance behind the stops 56 and at the forward ends of the side plates 38 of the supplemental frames in which the slides 44 are mounted, and said bolts or rods 67 are movably mounted in supports 68. The other bar 65 passes forwardly beneath the bar 64 and is extended forwardly of the main frame and is provided at its forward end with a pivot-pin 69, which moves in a segmental slot 70, formed in a curved arm 71, formed on or secured to a post 72, provided centrally with parallel lugs or projections 73 and at its lower end with a grooved roller 74. These features of construction are best shown in Figs. 1, 2, 6, and 9; but other figures of the drawings also show them.

As hereinbefore stated, this machine is composed of two separate similar subdivisions or parts, and most of the operative parts are therefore duplicated, and there are therefore two of the posts 72, and the front of the main frame is provided with forwardly-directed arms 75, having upwardly-directed extensions 76, provided with lugs or projections 77, which fit between the lugs or projections 73 on the posts 72 and are pivotally connected therewith at 78, and each of the posts 72 is provided with an arm 79, rigidly connected therewith.

Figures 4, 5:
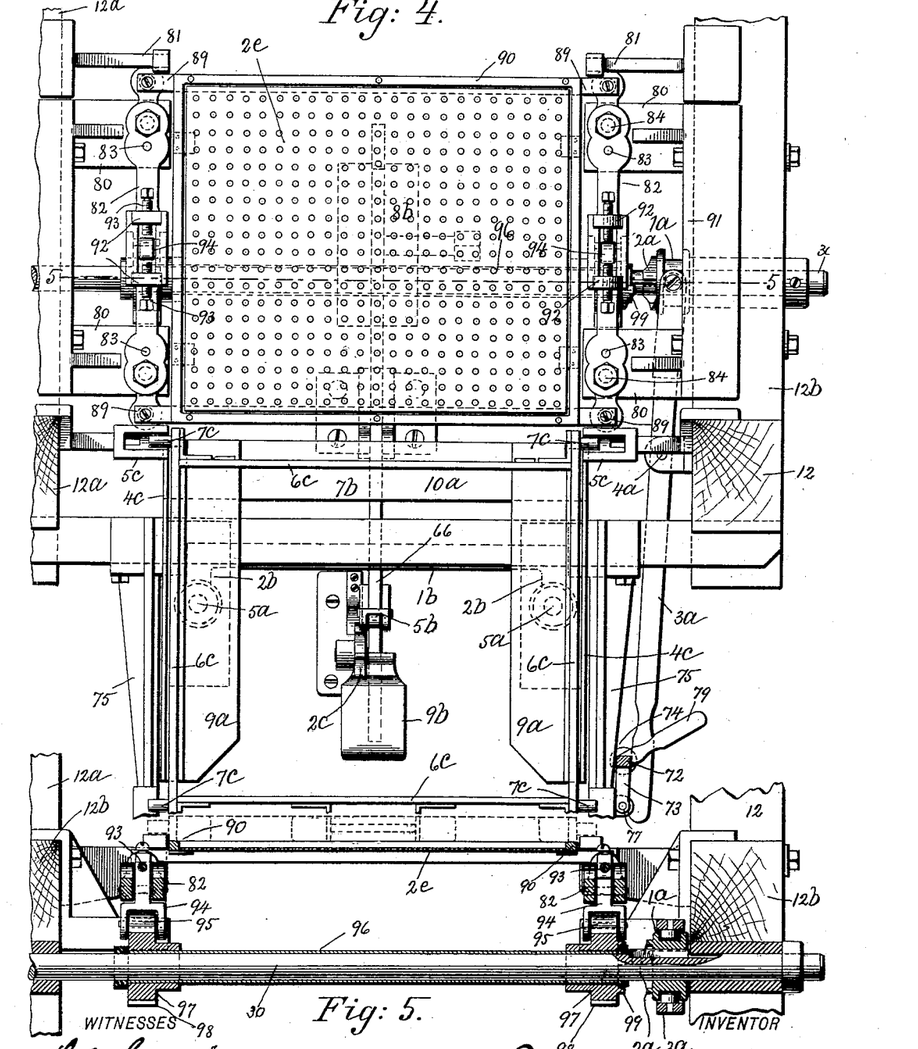
Fig. 4, a partial plan view of one subdivision of the machine below the line 4 4 of Figs. 1 and 3.
Fig. 5, a partial section on the line 5 5 of Fig. 4.
Figure 10:
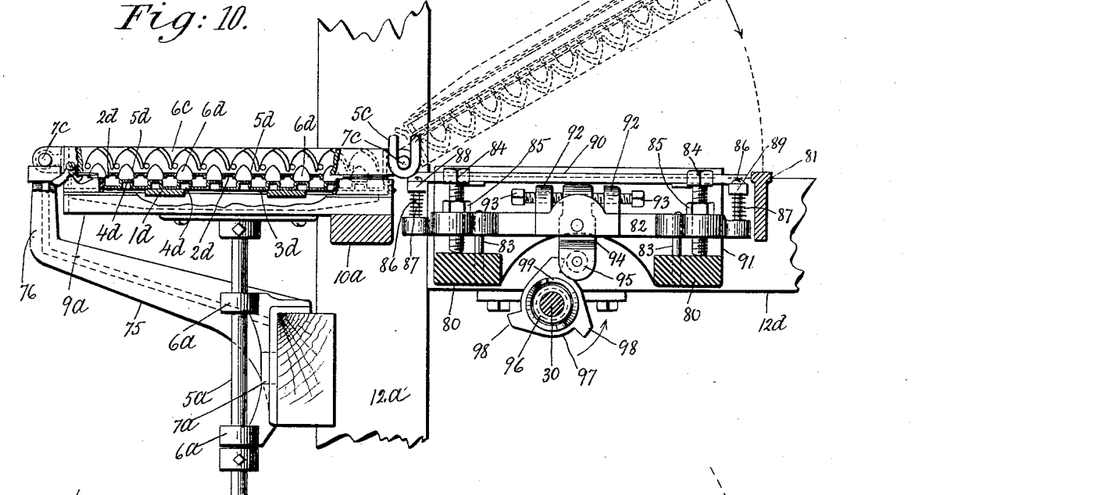
Fig. 10, a sectional side view of the construction.

In each subdivision of the main frame or of the machine and directly over the agitator-shaft 30 are mounted or secured brackets or supports 80, which are shown in plan in Fig. 4 and in section in Fig. 10, and these brackets or supports are secured to the horizontal bars $12^b$ and $12^d$ of the main frame by means of angle-plates 91, and rearwardly thereof are supplemental brackets or supports 81.

I also employ an agitator-frame consisting of side bars 82, provided with pins 83, which are adapted to move vertically in the brackets or supports 80, and passed through the side bars 82, adjacent to the ends thereof, are screws 84, proveded with set-nuts 85, and these screws bear on the brackets or supports 80, and by means thereof the position of the agitator-frame above said brackets or supports is regulated. The side bars 82 are also provided at their ends with screws 86, on which are placed springs 87, and resting on the springs 87 are front and back bars 88 and 89, through which the screws 86 are passed, and placed on the front and back bars 88 and 89 and secured thereto is a rigid supplemental frame 90. The supports or brackets 80 are secured to or formed integrally with angle side plates 91, between which the agitator-frame is placed, and the supplemental frame 90, which is supported by the springs 87, forms a part of the main agitator-frame, of which the side bar 82 and front and rear bars are the main members.

Each of the side bars 82 of the agitator-frame is provided centrally with upwardly-directed jaws 92, through each of which is passed a set-screw 93, and pivoted in each of the side bars 82, midway between the jaws 92, are hangers 94, the upper ends of which project between set-screws 93 and the lower ends of which carry a roller 95. The shaft 30, which extends from one side of the machine to the other, is provided in each subdivision of the machine with a tube 96, (see Fig. 5,) which extends from one side of the agitator-frame to the other, and these tubes are provided at each end with cam-wheels 97, having cam-teeth or projections 98, and one of said cam-wheels is provided with a clutch collar or flange 99.

At the right-hand side of each of the agitator-frames the shaft 30 is provided with a slidable clutch-collar $1^a$, having a clutch-head $2^a$, and this clutch-collar is adapted to move longitudinally on the shaft 30 and to engage the clutch-head 99 of the cam-wheel 97, and pivotally connected with each of the clutch-collars $1^a$ is a lever $3^a$, pivoted at $4^a$ and projecting forwardly of the machine and adapted to operate in connection with the roller 74 at the bottom of the post 72.

Mounted in front of the main frame of the machine and in front of each subdivision thereof are two vertically-movable shafts $5^a$, passing through keepers $6^a$, formed on or secured to brackets $7^a$, secured to the main frame of the machine, and the lower ends of said shafts are provided with collars $8^a$, by which the upward movement thereof is limited. The upper ends of each pair of the shafts $5^a$ are provided with a frame or support consisting of side plates $9^a$ and a rear cross-plate $10^a$, and the lower ends of the shafts $5^a$ or each pair of said shafts is connected by a cross-bar $1^b$, having forwardly-directed end extensions $2^b$. (Indicated in dotted lines in Fig. 4 and shown in full lines in Figs. 1 and 3.) The cross-bar $1^b$ is provided centrally with a downwardly and forwardly directed arm $3^b$, pivotally connected with a bar $4^b$, the lower end of which is pivotally connected at $5^b$ with a lever $6^b$, pivoted at $7^b$, and one end of which projects backwardly and is provided with a weight $8^b$ and the other end of which projects forwardly and is provided with a pedal $9^b$, and pivoted beneath the pedal $9^b$, as shown at $1^c$, is a catch or pawl $2^c$, which is adapted to engage the rear end of the pedal and which is forced forwardly by a spring $3^c$, this construction being clearly shown in Figs. 1, 2, and 3.

The side members $9^a$ of the frames or supports on the upper ends of the shafts $5^a$ are provided with angle-irons $4^c$, forming upwardly-directed side flanges on said frames or supports, and mounted rearwardly of and above the said frames or supports at each side thereof are U-shaped brackets $5^c$, and in the operation of this machine I employ basket or dipping frames $6^c$, which are rectangular in form and the sides of which fit in the angle-irons $4^c$ of the frame or support on the upper end of the shafts $5^a$, and said basket or dipping frames are provided at their four corners with lugs or projections $7^c$, two of which fit in the U-shaped brackets $5^c$ and form pivots on which the basket or dipping frames are turned, and the other two rest when the basket or dipping frames are in position on the said support or frame on the ends of the brackets or arms 75, as shown in Fig. 4.

The basket or dipping frames $6^c$ are provided in practice with wire baskets or body portions the same as those described and claimed in the United States Patent No. 663,359, granted to me on the 4th day of December, 1900, and in themselves form no part of the invention described and claimed herein, the construction and operation of these baskets or dipping frames and the body portions thereof being clearly shown and described in the patent above referred to. I also employ feed-boards $1^d$, a sectional view of one of which is given in Fig. 13 and which are of the same form as the frame or support on the upper ends of the vertically-movable shafts $5^a$, and these feed-boards consist of a stationary top member $2^d$ and a vertically-movable member $3^d$, and the bottom member $3^d$ is provided with raised portions $4^d$, distributed throughout its upper surface, while the top member $2^d$ is provided with corresponding holes or openings $5^d$, and in practice the candies to be coated, some of which are shown at $6^d$, are placed in the openings $5^d$ and rest on the raised portions $4^d$ of the bottom member of the feed-board and are projected through the openings in the top member when the bottom member is raised. The feed-board, with the candies thereon, is first slid into position on the frame or support connected with the vertically-movable shafts $5^a$, as shown in Fig. 10, and the basket or dipping frame is then swung down into position thereover, as shown in full lines in Fig. 10. The feed-board is then raised by releasing the catch $2^c$ from the pedal $9^b$, when the weight $8^b$ will raise the shafts $5^a$ and the feed-board is raised flush with the bottom of the basket-frame, and the candies are correspondingly raised. One hand of the operator is then placed under the feed-board, and the bottom member thereof is raised by hand, and the candies are projected into the forms of the basket-frames, while the other hand grasps the front edge of the basket-frame or the handle $7^d$, Fig. 3, connected therewith, and the said basket-frames and feed-boards are turned backwardly, as shown in dotted lines in Fig. 10, and lowered into the position shown in Fig. 11, in which position they rest over the agitator-frames, as shown in Fig. 10, being supported by the U-shaped brackets $5^c$ and the brackets or supports 81. The feed-boards are then removed, leaving the candies resting in the forms of the basket, and the basket rests approximately upon the agitator-frame and may be agitated thereby in the operation of the machine, as hereinafter described, and while the chocolate in a liquid condition is being distributed over the candies.

Arranged in the upper part of the main frame and over the rear portions of the supplemental frames, in which the slides 44 are mounted, and directly over the stationary plate 45 at the upper rear end of said supplemental frames are hoppers $8^d$, and these hoppers are designed to discharge the liquid chocolate into the supplemental frames or onto the plates 45 at the upper ends thereof in the operation of the machine, and each of these hoppers $8^d$ is provided with a strainer $9^d$, consisting of perforated metal or wire-gauze or any other preferred material.

Arranged below the supplemental frames and below the slides 44 when in their lowest position are downwardly and backwardly inclined chutes $1^e$, which are designed to receive the surplus or drippings of the chocolate as it is distributed over the candies in the basket or dipping frames as the latter rest on the agitator-frames and to return the same to the chocolate-receptacle 14. I also employ a perforated plate or board $2^e$, which is clearly shown in Figs. 4 and 5 and which in practice is placed in the top portion of the agitator-frame or within the supplemental frame of the agitator-frame, and when the basket or dipping frame is turned into the position shown in Fig. 11 it rests on or over this perforated board or plate and aids in distributing the chocolate over the candies as they are held in the basket or dipping frame and also prevent any of said candies from passing into the chutes $1^e$ and thence into the chocolate-receptacle if during the operation of the machine any of said candies should be detached from the basket or dipping frames when the chocolate is being distributed thereover. The forms in the basket with which the dipping or basket frames are provided are the same as hereinbefore stated, as are described and claimed in the United States patent hereinbefore referred to, and when the dipping frames or baskets are turned into the position shown in full lines in Fig. 11 in the operation of the machine and the chocolate has been fully distributed over the candies a sheet $3^e$ of paper or other suitable material is placed thereover and a plate or board $4^e$ is placed over said sheet, after which the basket or dipping frames are turned backwardly into the position shown in full lines in Fig. 10 and in dotted lines in Fig. 11, and the baskets or basket-frames are manipulated so as to discharge the candies on the said sheet of paper as it rests on the plate or board $4^e$. In this position of the parts the said plate or board $4^e$ rests on the vertically-movable frame or support connected with the upper ends of the shafts $5^a$, and the said frame or support being lowered the plate or board $4^e$, with the candies thereon, may be removed and placed in an ice-room or in driers.

It will be understood that in raising the shafts $5^a$ the catch or pawl $2^c$ is pressed backwardly and released from the pedal $9^b$, and the weight $8^b$ then operates to raise the shafts $5^a$; but in depressing the said shafts the foot is pressed upon the pedal $9^b$, and the latter is forced down until the catch-pawl $2^c$ engages therewith.

In the patent hereinbefore referred to the baskets or body portions of the basket or dipping frames are made of pivotally-connected parts forming receptacles or forms adapted to receive and hold the candies, which are operated in the manner described and claimed in said patent. The construction of the body portion or baskets of said basket or dipping frames are the same in this case as in the patent referred to; but the said forms or receivers are adapted to discharge the candies onto the plate or board 4$^e$ or onto the sheet of paper placed thereon, as above described, in a somewhat different manner. In this case the candies are held in the forms or receivers of the baskets by a spring-operated catch 6$^e$, having a finger or arm 7$^e$, which is operated by a lug or projection 8$^e$ on the frame or support connected with the tops of the shafts 5$^a$ when the basket or dipping frames are turned into the position shown in full lines in Fig. 10. In this operation the finger or arm 7$^e$ of the catch 6$^e$ strikes the lug or projection 8$^e$ and releases the locking mechanism which holds the candies in the receivers or forms of the baskets, and the operator then presses backwardly on a handle 9$^e$, forming a part of said mechanism, and the candies are discharged from the baskets onto the plate 4$^e$.

The partition-plate 14$^b$ in the chocolate-receptacle 14 is provided, as shown in Fig. 12, with an opening 1$^g$, having a slidable door 2$^g$, and by means of this construction the separate compartments of the chocolate-receptacle may be put in communication, and both divisions of the machine may be operated together whenever desired, or one division may be so operated, if necessary.

It will also be understood that a machine of this class may be provided with any desired number of subdivisions, such as those hereinbefore described, or may be provided with but one of such subdivisions.

The operation will be readily understood from the foregoing description when taken in connection with the accompanying drawings and the following statement thereof. In practice the chocolate is generally placed in the chocolate-receptacle in a liquid condition and is maintained at the desired temperature by means of the steam-pipe 13$^a$, which warms the water in the tank 13, or the chocolate may be placed in the chocolate-receptacle in any form and melted by the heating of the water in the tank 13, and it will also be understood that the temperature of the water in the tank 13 may be regulated as desired. In the operation of the machine the power is applied by a belt operating in connection with the wheel or pulley 22, and the main shafts, including the shafts 17, 25, and 30, are kept constantly revolving, and these shafts are common to the different subdivisions of the machine. In this operation the chocolate is conveyed from the chocolate-receptacle, by means of the buckets 15$^a$, up over the shaft 17 and dumped into the hoppers 8$^d$, and from said hoppers it flows onto the plates 45 in the upper ends of the supplemental frames in which the slides 44 are placed, and this flow of the chocolate is continuous. The operator stands in front of the machine and in front of one subdivision thereof, and at the beginning of the operation of the machine the shafts 5$^a$ of said subdivision are in the position shown in Fig. 1, and the feed-board or candy-holder 1$^d$, with the candies thereon, is placed on the frame at the top of said shafts, as shown in Fig. 10. The basket-frame is then turned backwardly into the position shown in full lines in said figure over the feed-board, and the feed-board is then raised by hand and the candies pressed into the candy holders or forms in the basket-frame, and while held in this position said frame and feed-board are together turned into the position shown in full lines in Fig. 11, where they rest on or over the perforated plate 2$^e$ and the agitator-frame. The arm or lever 79, connected with the post 72, is then operated so as to turn said post to the right, and in this operation the clutch on the shaft 33 is thrown inwardly, and the shaft 33 turns forwardly, and the chain 50 carries the slides 44 gradually downward into the position shown in Fig. 7. It will be understood that in this operation the chocolate is gradually flowing downwardly over said slides and through the opening 48 in the bottom slide and is distributed over the candies in the basket-frames. During this operation and at the same time the lever 3$^a$ is also operated by the roller at the bottom of the post 72, which swings outwardly, and the clutch on the shaft 30 is operated. The tube 96 on the shaft 30 and the cam-wheels 97 connected therewith are turned, and these cam-wheels, operating in connection with the hangers 94, continually agitate the agitator-frames and the basket-frames thereon, and the chocolate is shaken and distributed entirely over the surface of said candies, and the surplus chocolate flows through the plate 2$^e$ into the chute 1$^e$ thereunder and back into the chocolate-receptacle. It is necessary for the basket-frames to rest on the agitator a certain length of time in order that the chocolate may be thoroughly distributed over the candies, and during this time the operator devotes his attention to the other subdivision of the machine and operates it in the same manner. When the chocolate has been thoroughly distributed over the candies, the sheet 3$^e$ is placed over said candies, and the plate or board 4$^e$ is placed on said sheet, and the basket-frame, with said plate or board thereon, is turned backwardly into the position shown in dotted lines in Fig. 11, when the plate or board 4$^e$ rests on the vertically-movable support, and the candies are discharged thereon or onto the sheet 3$^e$, resting thereon, and the said plate or board 4$^e$ is then removed, with the candies thereon, and placed in a cooler or drier.

Figure 11:
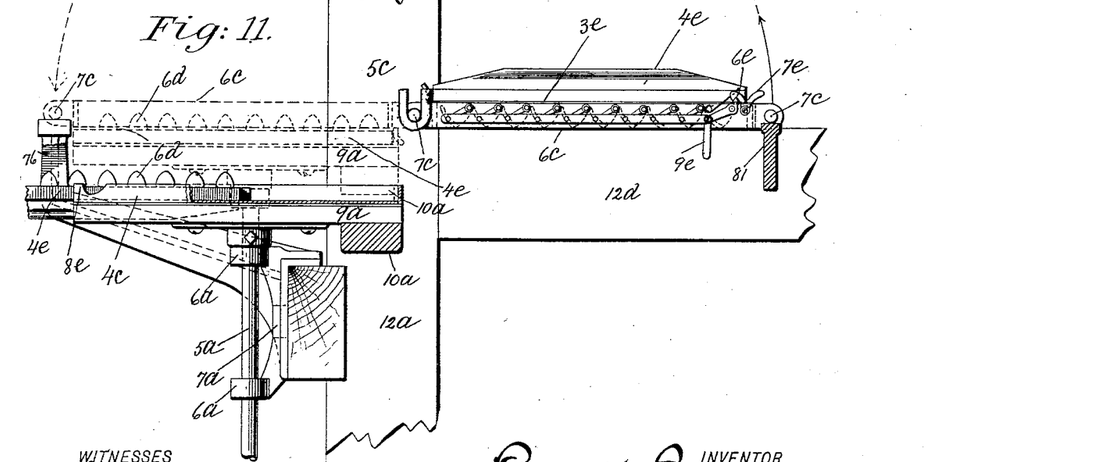
Fig. 11, a similar view omitting some of the parts and showing others in a different position.

It will be understood that the agitator-lever 3$^a$ may be operated by hand whenever desired to throw the agitator into or out of operation, and when the lower slide 44, which distributes the chocolate over the basket-frame in the position of the latter shown in Fig. 11, is at its lowest position, as shown in Fig. 7, the member 46, connected with said slide, strikes the bolt or rod 67 and moves it forwardly and operates the bar 64 to throw out the clutch on the shaft 33, and at this time the weights 55 reverse the movement of said shaft and draw back the slides 44 into the position shown in full lines in Fig. 8, and this movement of the parts is repeated as long as the machine is in operation.

The bar 65, which operates the clutch on the shaft 33, is operated by the arm 79, connected with the post 72, and may be moved in either direction by said arm, while the lever 3ª, which operates the agitator, may be operated by said arm in the outward movement thereof and must be operated by hand in the opposite movement; but this lever may be connected with the post 72, so as to operate the same by the arm 79 in both directions.

It will be apparent that this machine may be operated either by one or two men, and if made in one compartment or subdivision, as hereinbefore indicated, but one operator will be necessary under any circumstances; but if composed of a greater number of compartments or subdivisions then two, three, or more operators will be necessary. In the operation of the bucket-chains 15, as hereinbefore described, the said buckets and chains stir and agitate the chocolate in the chocolate-receptacle and keep the same thoroughly agitated or mixed at all times and also keep the said chocolate at an even temperature, and this result facilitates the operation of the machine. It will also be apparent that many changes in and modifications of the construction herein described may be made without departing from the spirit of my invention or sacrificing its advantages, and I reserve the right to make all such alterations therein as fairly come within the scope of the invention.

Having fully described my invention, what I claim as new, and desire to secure by Letters Patent, is—

1. A candy-coating machine, comprising a frame, a chocolate-receptacle mounted therein, a shaft mounted in said receptacle, a shaft mounted over said receptacle, bucket-chains mounted on said shafts and adapted to raise the chocolate out of the receptacle, a hopper mounted in front of and below the upper shaft and adapted to receive the chocolate from said buckets, a supplemental downwardly-inclined frame supported beneath said hopper, slides mounted in said frame and adapted to receive the chocolate from said hopper, an agitator-frame mounted under and forwardly of said slides and a basket or dipping frame adapted to receive candies and to be placed on said agitator, and means for operating said parts, substantially as shown and described.

2. A machine of the class described, provided with a supplemental downwardly and forwardly inclined frame, slides mounted in said frame, means for depositing chocolate in the upper end of said frame, and means for operating said slides, substantially as shown and described.

3. A machine of the class described, provided with a supplemental downwardly-inclined frame, a plate mounted in the upper end of said frame, slides mounted below said plate and adapted to be moved from the upper end to the lower end of said frame, the lower slide being provided with a transverse opening, means for discharging chocolate onto said plate, devices for operating said slides, an agitator-frame mounted under said supplemental frame and a candy-basket or dipping-frame adapted to receive candies and to be agitated by said agitator-frame, substantially as shown and described.

4. In a machine of the class described, an agitator-frame, a shaft mounted thereunder, a tube mounted on said shaft and provided at its opposite ends with cam-wheels, and devices connected with said frame and operated by said cam-wheels for agitating said frame, substantially as shown and described.

5. In a machine of the class described, an agitator-frame, a shaft mounted beneath said frame, a tube mounted on said shaft and provided at its opposite ends with cam-wheels, devices connected with said frame and operated by said cam-wheels for agitating said frame, one of said cam-wheels being provided with a clutch-head, and a movable collar mounted on said shaft, and operating in connection with said clutch-head, substantially as shown and described.

6. In a machine of the class described, an agitator-frame, a vertically-movable support mounted in front of the agitator-frame, a feed-board adapted to receive the candies to be coated and to be placed on said support, and a basket or dipping frame adapted to rest over said support and over said agitator-frame and to be turned into either position, substantially as shown and described.

7. A machine of the class described, provided with an agitator-frame, a stationary frame mounted over said agitator-frame and provided with slides arranged in an inclined position, means for discharging liquid chocolate onto said slides, a vertically-movable support mounted in front of the agitator-frame, a basket or dipping frame adapted to rest on said support and on said agitator-frame and to be turned into either position, and a feed-board adapted to be placed on said support and receive candies, said feed-board being adapted to be raised so as to pass the candies into the basket or dipping frame, substantially as shown and described.

8. In a machine of the class described, a vertically-movable support, a vertically-movable rod or bar pivotally connected with said support, a lever pivoted beneath said rod or bar and provided at one end with a weight, and at the opposite end with a spring-catch and a pedal connected with said end of said lever, and adapted to be engaged by said catch, substantially as shown and described.

9. In a machine of the class described, an agitator-frame, a stationary supplemental frame mounted thereover, inclined slides mounted in said supplemental frame one over the other, the bottom slide being provided with a transverse opening, a drive-chain mounted beneath said slides and in connection with the bottom slide, a clutch-shaft over which said chain passes and by which it is operated, a clutch-shaft for operating the agitator-frame, and means for operating the clutches on said shafts, substantially as shown and described.

10. In a machine of the class described, an agitator-frame, a stationary supplemental frame mounted thereover, inclined slides mounted in said supplemental frame one over the other, the bottom slide being provided with a transverse opening, a drive-chain mounted beneath said slides and in connection with the bottom slide, a clutch-shaft over which said chain passes and by which it is operated, a clutch-shaft for operating the agitator-frame, and means for operating the clutches on said shafts, jointly or independently, substantially as shown and described.

11. In a machine of the class described, an agitator-frame, a stationary supplemental frame mounted thereover, and provided with downwardly-inclined slides one of which is placed over the other, means for discharging chocolate onto said slides, a shaft by which said slides are operated, clutch devices connected with said shaft, and means for operating said clutch devices, substantially as shown and described.

12. In a machine of the class described, a vertically-adjustable agitator-frame composed of side bars, vertically-movable spring-supported bars at the front and back of said frame, a supplemental frame mounted on said spring-supported bars and a perforated plate or spring adapted to be placed in said supplemental frame, substantially as shown and described.

13. In a machine of the class described, an agitator-frame, a stationary supplemental frame mounted thereover, an inclined stationary supplemental frame mounted thereover, a stationary plate in the upper end of said supplemental frame, slides mounted in the bottom part of said frame and below said stationary plate, one of said slides being adapted to operate the others, a clutch-shaft for operating said slides, a clutch-shaft for operating the agitator-frame, a post mounted in front of the agitator-frame, and devices adapted to be operated by said post for operating the clutches on said shafts, substantially as shown and described.

14. In a machine of the class described, an inclined supplemental stationary frame, slides mounted in the bottom of said frame, and in operative connection, one of said slides being provided with a slot or opening therein, a drive-chain mounted under said frame and in operative connection with one of said slides, a shaft over which said chain passes, a pulley or drum mounted on said shaft and a flexible device connected with said pulley or drum and passed over another pulley and provided with weights, substantially as shown and described.

15. In a machine of the class described, a basket or dipping frame rectangular in form, and provided at its four corners with lugs or projections forming supports, and three sets of brackets for supporting said frame, said sets of brackets being arranged in line and the central set being U-shaped in cross-section, substantially as shown and described.

16. In a machine of the class described, a supplemental inclined frame, a stationary plate in the upper end of said frame, a plurality of slides mounted under said plate and in operative connection and also in connection with said plate, said slides being mounted one above another, the lower slide being provided with a transverse slot or opening and with an upwardly-directed foot-plate, a hopper arranged over the upper end of said frame and adapted to discharge liquid chocolate upon said plate, means for supplying chocolate to said hopper, and devices for operating said slides, substantially as shown and described.

17. In a machine of the class described, a supplemental stationary inclined frame, a transverse plate mounted in the upper end of said frame, a plurality of slides mounted under said plate one above another, the upper slide being adapted to engage said plate, and all of said slides being in operative connection, the bottom slide being provided with a transverse slot or opening, and a foot-plate which projects thereover, a shaft mounted in the upper end of said frame, a drive-chain mounted on said shaft and in operative connection with the bottom slide, and means for operating said shaft, substantially as shown and described.

18. In a machine of the class described, a supplemental stationary inclined frame, a transverse plate mounted in the upper end of said frame, a plurality of slides mounted under said plate one above another, the upper slide being adapted to engage said plate, and all of said slides being in operative connection, the bottom slide being provided with a transverse slot or opening, and a foot-plate which projects thereover, a shaft mounted in the upper end of said frame, a drive-chain mounted on said shaft and in operative connection with the bottom slide, and means for operating said shaft, consisting of a clutch device connected therewith, a yoke connected with said clutch device and provided with a pivotally-supported cross-head and bars connected with the opposite ends of said cross-head, one of which is adapted to be operated by the bottom slide and the other of which is provided with independent operating devices, substantially as shown and described.

19. In a machine of the class described, an agitator-frame, a shaft mounted thereunder, hangers pivoted to said frame and provided with rollers in their lower ends, a tube mounted on said shaft and provided at its opposite ends with cam-wheels which operate in connection with said rollers, and devices for turning said tube with said shaft, and for turning said shaft independently of said tube, substantially as shown and described.

20. In a machine of the class described, an agitator-frame provided with hangers 94 which project above and extend below said frame, set-screws supported on the opposite sides of the upper ends of said hangers, and rollers mounted in the lower ends of said hangers, and devices operating in connection with said rollers to operate said agitator-frame, substantially as shown and described.

21. In a machine of the class described, an agitator-frame, provided with hangers 94 which project above and extend below said frame, set-screws supported on the opposite sides of the upper ends of said hangers, and rollers mounted in the lower ends of said hangers, and devices operating in connection with said rollers to operate said agitator-frame, said frame being also vertically adjustable and being provided with guide-pins which pass through its supports, substantially as shown and described.

22. In a machine of the class described, a frame, a chocolate-receptacle mounted in the bottom thereof, a shaft within said receptacle, a shaft supported over said frame, wheels connected with said shafts, bucket-chains mounted on said wheels, and guides secured in said frame between the separate reaches of the chains to prevent the interfering of the separate reaches of said chains, substantially as shown and described.

23. In a machine of the class described, a vertically-adjustable agitator-frame mounted on suitable supports, and provided with guide-pins which pass into said supports, and a perforated screen or plate mounted on the agitator-frame, substantially as shown and described.

24. In a machine of the class described, a vertically-adjustable agitator-frame, devices for operating said frame, a screen mounted on said frame, a basket or dipping frame adapted to hold candies and to rest on said agitator-frame over said screen, and means for distributing chocolate in a liquid condition over the candies in said basket or dipping frame, substantially as shown and described.

25. In a machine of the class described, a vertically-adjustable agitator-frame, and devices for operating the same, a screen adapted to be placed on said frame, a vertically-movable support mounted in front of the agitator-frame, and devices for operating the same, a feed-board adapted to be placed on said support, and a basket or dipping frame provided with supports by which it may be held over the agitator-frame or over said support, said basket or dipping frame being adapted to be turned into either position, substantially as shown and described.

26. In a machine of the class described, a vertically-movable support, a feed-board adapted to be placed thereon, and provided with means for holding candies to be coated, and a basket or dipping frame adapted to be placed over said feed-board, said feed-board being also adapted to be raised so as to project the candies into said basket or dipping frame, substantially as shown and described.

27. In a machine for coating candies, a chocolate-receptacle, a hopper provided with a transverse screen, means for conveying the chocolate from said receptacle into said hopper, an agitator-frame mounted in front of and beneath said hopper, a basket or dipping frame adapted to receive candies to be coated, and also adapted to be placed over said agitator-frame, and devices for conveying the chocolate from said hopper, and distributing it over said basket or dipping frame, substantially as shown and described.

28. In a machine for coating candies, a chocolate-receptacle, a hopper mounted over said receptacle, means for conveying chocolate over said receptacle into said hopper, an agitator-frame mounted in front of and beneath said hopper, and provided with a screen, a basket or dipping frame adapted to be placed on said agitator-frame, and adapted to hold candies to be coated, devices for conveying chocolate from said hopper and distributing the same over said basket or dipping frame and the candies held therein, and a chute placed beneath the agitator-frame and communicating with the chocolate-receptacle, substantially as shown and described.

29. A machine for coating candies, composed of a plurality of similar subdivisions, each of which is provided with its own operative mechanism, main and supplemental power-shafts, common to all of the subdivisions of the machine, and adapted to operate the separate mechanism of each, the separate mechanism of each subdivision being adapted to be independently or jointly operated, substantially as shown and described.

30. In a machine for coating candies, a chocolate-receptacle, a power-shaft supported thereover, another shaft mounted in said receptacle, bucket-chains mounted on said shafts, a hopper mounted in front of and below the power-shaft and provided with a transverse screen, an agitator-frame mounted in front of and below said hopper, and provided with a screen, a stationary supplemental frame supported in an inclined position between the hopper and the agitator-frame, and slides mounted in said supplemental frame and adapted to convey chocolate from said hopper, and distribute the same over said basket or dipping frame, substantially as shown and described.

31. In a machine for coating candies, a chocolate-receptacle, a power-shaft supported thereover, another shaft mounted in said receptacle, bucket-chains mounted on said shafts, a hopper mounted in front of and below the power-shaft and provided with a transverse screen, an agitator-frame mounted in front of and below said hopper, and provided with a screen, a stationary supplemental frame supported in an inclined position between the hopper and the agitator-frame, and slides mounted in said supplemental frame and adapted to convey chocolate from said hopper, and distribute the same over said basket or dipping frame, and a chute placed beneath the agitator-frame and communicating with the chocolate-receptacle, substantially as shown and described.

32. In a machine for coating candies, a main frame, a chocolate-receptacle mounted in the lower rear portion thereof, a power-shaft supported above the main frame, a shaft vertically adjustable in the chocolate-receptacle, wheels connected with both of said shafts, bucket-chains mounted on said wheels, a hopper supported in front of and below the power-shaft and adapted to receive chocolate from said buckets, an agitator-frame supported in front of and below said hopper, a basket or dipping frame adapted to hold candies, and to be placed over the agitator-frame, devices for conveying the chocolate to the basket or dipping frame and distributing the same over the candies therein, and a chute placed beneath the agitator-frame and communicating with the chocolate-receptacle, substantially as shown and described.

33. In a machine for coating candies, a main frame, a water-tank mounted in the bottom rear portion thereof, a chocolate-receptacle supported in said tank, a shaft vertically adjustable in said chocolate-receptacle a power-shaft supported over the main frame, sprocket-wheels connected with each of said shafts, bucket-chains mounted on said wheels, a hopper supported in front of and below the power-shaft, an agitator-frame supported in front of and below the hopper, and provided with a screen, a basket or dipping frame adapted to receive candies and to rest on said agitator-frame, devices for conveying chocolate in a liquid condition over said hopper, and distributing it over the candies in said basket or dipping frame, said basket or dipping frame being adapted to turn over said support, substantially as shown and described.

34. In a machine for coating candies, a main frame, an agitator-frame mounted therein and provided with a screen, a basket or dipping frame adapted to receive candies and to rest on or over said agitator-frame, means for distributing chocolate in a liquid condition over said basket or dipping frame and over the candies held therein, a vertically-movable support mounted in front of the main frame and in front of the agitator-frame, a feed-board adapted to be placed on the said support, and provided with raised portions for supporting candies, said basket or dipping frame being adapted to be turned into position over said support and feed-board, and said feed-board being adapted to be raised so as to force the candies into the basket or dipping frame, substantially as shown and described.

35. In a machine of the class described, a supplemental frame, downwardly and forwardly inclined slides mounted therein, a shaft geared in connection with one of said slides and adapted to operate all of said slides, a clutch device connected with said shaft, means for turning said shaft continuously in one direction when said clutch is in operation, and devices for turning said shaft in the opposite direction when said clutch is not in operation, substantially as shown and described.

36. In a machine of the class described, a supplemental frame, downwardly and forwardly inclined slides mounted therein, a shaft geared in connection with one of said slides and adapted to operate all of said slides, a clutch device connected with said shaft, means for turning said shaft continuously in one direction when said clutch is in operation, and devices for turning said shaft in the opposite direction when said clutch is not in operation, said last-named devices being adapted to be operated by one of said slides, substantially as shown and described.

37. In a machine for coating candies, a chocolate-receptacle, an agitator-frame mounted in front of and above said receptacle and provided with a screen, a basket or dipping frame adapted to receive candies and to be placed over said agitator-frame, and devices for conveying the chocolate from the chocolate-receptacle, and for distributing the same over the basket or dipping frame and over the candies therein, substantially as shown and described.

38. In a machine for coating candies, a chocolate-receptacle, an agitator-frame mounted in front of and above said receptacle and provided with a screen, a basket or dipping frame adapted to receive candies and to be placed over said agitator-frame, and devices for conveying the chocolate from the chocolate-receptacle, and for distributing the same over the basket or dipping frame and over the candies therein, and a chute supported beneath the agitator-frame and in communication with the chocolate-receptacle, substantially as shown and described.

39. A machine of the class described, provided with a shaft 33, a clutch device connected therewith, a shaft 30 and a clutch device connected therewith, a lever 3ª for operating the clutch device on the shaft 30, bars 64 and 65 for operating the clutch device on the shaft 33, means for operating the bar 64, a pivoted post 72 with which the bar 65 is connected, and means for operating the post 72, substantially as shown and described.

40. In a machine for coating candies, an agitator-frame, an inclined supplemental stationary frame mounted thereover, a stationary plate in the upper end of said frame, a plurality of slides arranged one above another and beneath said plate, the top slide being adapted to engage said plate and each of the other slides being in operative connection, the bottom slide being also provided with a transverse slot or opening, and at the lower end thereof with an upwardly-directed member and with a downwardly-directed plate, and means for operating said slides, substantially as shown and described.

41. In a machine for coating candies, an agitator-frame provided with a screen, a vertically-movable support mounted in front of said frame, a feed-board adapted to be placed on said support, and provided with means for holding candies to be coated, and a basket or dipping frame adapted to be supported over said feed-board and over said agitator-frame, and to be turned into either position, said feed-board being adapted to be raised independently of its support, so as to force the candies into the basket or dipping frame, substantially as shown and described.

42. In a machine of the class described, an inclined frame or support, slides mounted therein and in operative connection, a clutch-shaft for operating said slides, a slidable pin or bolt supported in front of said slides and adapted to be operated by one of them, and devices in operative connection with said pin or bolt and with the clutch on said shaft, substantially as shown and described.

43. In a machine of the class described, a main frame, an agitator-frame mounted therein, a shaft for operating said agitator-frame, an inclined supplemental frame mounted over the agitator-frame, chocolate-distributing devices mounted in said supplemental frame, a shaft for operating the chocolate-distributing devices, and means for reversing the movement of said shaft in both directions, substantially as shown and described.

44. In a machine of the class described, a main frame, an agitator-frame mounted therein, a basket or dipping frame adapted to hold candies, and to be supported by or over said agitator-frame, a stationary inclined supplemental frame supported above the agitator-frame, wheels mounted therein and adapted to distribute chocolate over the basket or dipping frame, means for conveying chocolate to and discharging the same upon said slides, and a shaft in operative connection with said slides, and adapted to operate the same, said shaft being geared in connection with the main power-shaft of the machine, and devices for reversing the movement of said shaft, substantially as shown and described.

45. A machine for coating candies, comprising a main frame and separate similar subdivisions, a chocolate-receptacle mounted in the lower rear portion thereof and divided into separate compartments corresponding with the separate subdivisions of the machine, said compartments being adapted to be placed in communication, each of said subdivisions of the machine being provided with its own operative mechanism for coating candies, and main and supplemental power-shafts common to all of the subdivisions of the machine, and in operative connection with the separate mechanism of each, substantially as shown and described.

46. A machine for coating candies, comprising separate similar subdivisions, each of which is provided with its own operative mechanism, a chocolate-receptacle mounted in the lower rear portion of the machine, and divided into separate compartments corresponding with the separate subdivisions of the machine, main and supplemental power-shafts mounted in the frame of the machine and common to all the subdivisions thereof, and main and supplemental power-shafts being geared in connection with the mechanism of each subdivision, substantially as shown and described.

47. A machine for coating candies, comprising a main frame, a chocolate-receptacle mounted in the lower portion thereof, means for heating the chocolate in said receptacle, a main power-shaft mounted above the main frame, a shaft mounted in the chocolate-receptacle, sprocket-wheels mounted on said shafts, bucket-chains mounted on said wheels, a hopper mounted in front of and below the main power-shaft, an agitator-frame mounted in front of and below the hopper and provided with a screen, a basket or dipping frame adapted to receive candies to be coated, and to be placed on said agitator-frame, devices for conveying chocolate from said hopper and distributing the same over the basket or dipping frame and the candies therein, a chute placed beneath the agitator-frame and communicating with the chocolate-receptacle, and means for operating the basket or dipping frame, substantially as shown and described.

48. In a candy-coating machine, an agitator-frame, devices for operating said frame, a perforated plate adapted to be placed on said frame, and a basket or frame adapted to receive candies to be coated and to be placed on said agitator-frame over said plate, substantially as shown and described.

49. In a machine of the class described, a feed-board consisting of top and bottom plates, the top plate being provided with a downwardly-directed member or members which support the bottom plate and said bottom plate being provided with raised portions, and the top plate being provided with corresponding openings over said raised portions and said bottom plate being vertically movable, substantially as shown and described.

50. In a machine of the class described, a chocolate-receptacle, a shaft mounted thereover, bucket-chains passing around said shafts and provided with buckets, the chains and buckets both moving in said receptacle, a hopper mounted in front of and below the upper shaft, a screen arranged horizontally in said hopper, devices for conveying the chocolate from said hopper and distributing same over candies to be coated therewith, and for returning the surplus chocolate to the receptacle, substantially as shown and described.

51. In a machine for coating candies, a vertically-adjustable agitator-frame, means for operating the same, a perforated plate adapted to be supported by said frame, and a basket or dipping frame adapted to receive candies to be placed upon said agitator-frame over said perforated plate, substantially as shown and described.

52. In a machine for coating candies, a vertically movable and adjustable agitator-frame, means for operating the same, a screen placed thereon, a basket or dipping frame for holding the candies on said frame and means for distributing the chocolate or other material in a liquid condition over said candies, substantially as shown and described.

In testimony that I claim the foregoing as my invention I have signed my name, in presence of the subscribing witnesses, this 22d day of December, 1900.

PANAYIOTIS PANOULIAS.

Witnesses:
F. A. STEWART,
M. K. LOWERRE.